(12) United States Patent
Swearingen et al.

(10) Patent No.: US 11,370,007 B2
(45) Date of Patent: Jun. 28, 2022

(54) ENCAPSULATED REACTANT AND PROCESS

(71) Applicant: SPECIALTY EARTH SCIENCES, LLC, New Albany, IN (US)

(72) Inventors: Lindsay Swearingen, Floyds Knobs, IN (US); Jason Swearingen, Floyds Knobs, IN (US)

(73) Assignee: SPECIALTY EARTH SCIENCES, LLC, New Albany, IN (US)

( * ) Notice: Subject to any disclaimer, the term of this patent is extended or adjusted under 35 U.S.C. 154(b) by 794 days.

(21) Appl. No.: 16/252,938

(22) Filed: Jan. 21, 2019

(65) Prior Publication Data

US 2019/0151913 A1    May 23, 2019

Related U.S. Application Data

(60) Continuation-in-part of application No. 12/269,520, filed on Nov. 12, 2008, now Pat. No. 10,335,757, which is a continuation-in-part of application No. 12/169,434, filed on Jul. 8, 2008, now abandoned, which is a continuation of application No. 11/072,118, filed on Mar. 4, 2005, now Pat. No. 7,431,849, application No. 16/252,938, filed on Jan. 21, 2019, which is a continuation-in-part of application No. 15/450,369, filed on Mar. 6, 2017, now Pat. No. 10,821,489, which is a division of application No. 14/024,046, filed on Sep. 11, 2013, now Pat. No. 9,611,421, which is a division of application No. 13/088,217, filed on Apr. 15, 2011, (Continued)

(51) Int. Cl.
| | |
|---|---|
| *B09C 1/08* | (2006.01) |
| *C02F 1/72* | (2006.01) |
| *C02F 1/68* | (2006.01) |
| *B09C 1/00* | (2006.01) |
| *C09K 8/536* | (2006.01) |
| *C02F 103/06* | (2006.01) |
| *C02F 103/00* | (2006.01) |
| *C02F 101/36* | (2006.01) |

(52) U.S. Cl.
CPC ............. *B09C 1/08* (2013.01); *B09C 1/002* (2013.01); *C02F 1/688* (2013.01); *C02F 1/72* (2013.01); *C09K 8/536* (2013.01); *B09C 2101/00* (2013.01); *C02F 1/722* (2013.01); *C02F 2101/36* (2013.01); *C02F 2101/363* (2013.01); *C02F 2103/007* (2013.01); *C02F 2103/06* (2013.01)

(58) Field of Classification Search
CPC . B09C 1/08; B09C 1/002; C02F 1/688; C02F 1/72
USPC .......................................................... 427/212
See application file for complete search history.

(56) References Cited

U.S. PATENT DOCUMENTS

| | | | |
|---|---|---|---|
| 6,527,051 B1 * | 3/2003 | Reddy .................... | B01J 13/22 166/300 |
| 10,183,316 B2 * | 1/2019 | Dugan ................... | B09C 1/002 |

\* cited by examiner

*Primary Examiner* — Tabatha L Penny
(74) *Attorney, Agent, or Firm* — Witters & Associates; Steve Witters

(57) ABSTRACT

An encapsulated reactant(s) having at least one encapsulant and at least one reactant, and methods of making and using the encapsulated reactant(s), are is presently provided. An outermost encapsulant is substantially nonreacting, impermeable and nondissolving with water. The reactant(s) contribute to at least one reaction with contaminants in environmental media rendering the environmental media less harmful.

13 Claims, 1 Drawing Sheet

Related U.S. Application Data now abandoned, which is a continuation of application No. 12/169,434, filed on Jul. 8, 2008, now abandoned.

(60) Provisional application No. 60/550,799, filed on Mar. 5, 2004.

ENCAPSULATED REACTANT AND PROCESS

CROSS-REFERENCE TO RELATED APPLICATIONS

The instant application is a continuation-in-part of U.S. patent application Ser. No. 12/269,520 now U.S. Pat. No. 10,335,757) and U.S. patent application Ser. No. 15/450,369. U.S. patent application Ser. No. 12/269,520 was filed on Nov. 12, 2008, and is a continuation-in-part of U.S. patent application Ser. No. 12/169,434, filed Jul. 8, 2008, which in turn is a continuation of and claims priority to U.S. patent application Ser. No. 11/072,118, filed Mar. 4, 2005 (now U.S. Pat. No. 7,431,849), which in turn claims priority to U.S. Provisional Application Ser. No. 60/550,799, filed Mar. 5, 2004, all of which are hereby incorporated by reference in their entirety. U.S. patent application Ser. No. 15/450,369 was filed on Mar. 6, 2017, and is a divisional of and claims the benefit of U.S. patent application Ser. No. 14/024,046 now U.S. Pat. No. 9,611,421), filed on Sep. 11, 2013, which is a divisional of and claims the benefit of U.S. patent application Ser. No. 13/088,217, filed Apr. 15, 2011, which is a continuation of and claims the benefit of U.S. patent application Ser. No. 12/169,434 filed on Jul. 8, 2008, which in turn is a continuation of U.S. patent application Ser. No. 11/072,118 filed on Mar. 4, 2005, issued as U.S. Pat. No. 7,431,849, all of which are hereby incorporated by reference in their entirety.

FIELD OF INVENTION

The present invention relates to reactant(s), methods for making the reactant(s), and methods for the in situ and ex situ remediation of hazardous organic compounds in soil, groundwater, and surface water.

BACKGROUND OF THE INVENTION

Discharges of hazardous organic compounds into the environment have led to contamination of surface water, soil, and aquifers resulting in potential public health problems and degradation of the land for future use. As used in this specification and appended claims, hazardous organic compound means a chemical or substance that is either toxic or highly toxic, an irritant, corrosive, a strong oxidizer, a strong sensitizer, combustible, either flammable or extremely flammable, dangerously reactive, pyrophoric, pressure-generating, a compressed gas, a carcinogen, a teratogen, a mutagen, a reproductive toxic agent, or is suspected of having adverse health effects on humans. In many cases, subsurface groundwater contaminant plumes may extend hundreds to thousands of feet from the source area of chemical release resulting in extensive contamination. These chemical contaminants may then be transported into drinking water sources, lakes, rivers, and even basements of homes.

The U.S. Environmental Protection Agency (USEPA) has established maximum concentration limits (MCL's) for various hazardous organic compounds in water and soils. For instance, stringent drinking water limits placed on many solvent organic compounds in water can be as low as 0.005 µg/L (parts per billion).

The presence of hazardous organic compounds in subsurface soils, surface water, and groundwater is a well-documented and extensive problem. The source of these hazardous materials is often times from industry where the materials are released onto the soil surface or surface water or even into the subsurface soil and/or groundwater through leaking storage tanks. Many, if not most, of these organic compounds are capable of moving through the soil under the influence of moving water, gravity, or capillary action and serve as a source of groundwater contamination. As used in this specification and appended claims, soil is to be interpreted broadly to include all naturally occurring material found below ground surface (e.g. silts, clays, sands, rock, karsts, organics, tills, etc.).

Soil, surface water, groundwater, and wastewater can become contaminated by a variety of substances. The substances include, without limitation, volatile, semi-volatile, and non-volatile organic compounds. Common examples of such contaminates include PCBs, gasoline, oils, wood preservative wastes, and other hazardous organic compounds. Such other hazardous organic compounds may include, but not limited to, chlorinated solvents (such as trichloroethylene (TCE), vinyl chloride, tetrachloroethylene (PCE), dichloroethanes), ethylene dibromide, halobenzenes, polychlorinated biphenyls, acetone, ter-butyl alcohol, tert-butyl formate, and anilines. Additional contaminants include compounds containing at least one oxidizable aliphatic or aromatic compound and/or functional group (e.g. atrazine, benzene, butyl mercaptan, chlorobenzene, chloroethylvinyl ether, chloromethyl methyl ether, chlorophenol, chrysene, cyanide ion or organic cyanides, dichlorophenol, dichlorobenzene, dichloroethane, dichloroethene, dichloropropane, dichloropropene, ethyl alcohol, ethylbenzene, ethylene glycol, ethyl mercaptan, hydrogen sulfide, isopropyl alcohol, Lindane™, methylene chloride, methyl tert-butyl ether, naphthalene, nitrobenzene, nitrophenol, pentachlorophenol, phenanthrene, phenol, propylene, propylene glycol, Silvex™, Simazine™, sodium sulfide, tetrachloroethane, tetrachloroethene, toluene, trichlorobenzene, trichloroethane, trichloroethene, trichlorophenol, vinyl chloride, xylene, etc).

Contaminated soil, surface water and groundwater must be removed or treated to make it less toxic and to meet USEPA requirements. There are a variety of reactants and methods for treating contaminated soil, surface water, groundwater, and wastewater as discussed below. Peroxydisulfates have been reported as applied constituents for organic carbon digestion or decomposition. Application methods include thermally activated persulfate oxidation in conjunction with an electro-osmosis system to heat and transport persulfate anions into soils. Permanganate(s) and peroxygen(s) reactant(s) have also been reported as applied constituents for oxidation of organic compounds. Peroxygen compound(s) applied independently or in conjunction with a metallic salt catalyst(s) (complexed and not complexed; chelated and not chelated) have been shown to break down organic compounds within the soil, groundwater, and wastewater.

Groundwater and subsurface soil typically has been treated by injecting reactant(s), with or without a catalyst(s), within an aqueous mixture, slurry, or suspension into the subsurface. Injection into the subsurface is accomplished by gravity feed or the use of a pump(s) to increase well head pressure. This results in the subsurface dispersion of the reactant(s) within the area of the injection well.

Another method for in situ treatment of groundwater includes the excavation of a trench at or beyond a subsurface plume of organic and/or inorganic contaminant(s). The trench is filled with reactant(s) and a permeable media(s) (i.e. sand) for the plume to flow through, subsequently reacting oxidizable organic and/or inorganic compounds that come into contact with the reactant(s).

The methods used for ex situ treatment or in situ treatment of surface contamination, water or soil, typically involves the direct application of the reactant(s) to the hazardous organic compound(s). In the case of ex situ surface soil treatment, the soil is often times mixed or tilled to ensure contact of the reactant(s) with the hazardous organic compound(s).

Meeting USEPA cleanup criteria with these reactants and methods of the prior art has been found to be difficult, costly, and even impossible. With some of these current methods and reactants, there has been questionable showing that their application results in the effective or efficient removal of contaminants.

Current methods involving the use of peroxide group(s) (i.e. hydrogen peroxide) in conjunction with iron salt catalyst(s) have shown to be relatively inefficient, often resulting in incomplete contaminant oxidation. Hydrogen peroxide in particular has been found to lack persistence in contaminated soils and groundwater due to rapid dissociation. Many of these current employed reactants are hazardous and difficult to handle.

Recently, the use of permanganate(s) has been found to be a more effective oxidizing agent of certain hazardous organic compound(s). However, known methods of permanganate use to remediate a site require exceedingly large quantities of permanganate(s) to overcome the natural oxidant demand exerted by the soil, thereby limiting the percentage available for oxidizing the hazardous organic compound(s). Large amounts of permanganate(s) are thus required per unit of soil and groundwater volume, limiting the application of this technology due to high cost. Additionally, a product of the permanganate(s) oxidation reaction is solid manganese dioxide which precipitates and clogs the soil or aquifer, resulting in a reduced permeability of the soil to water. This reduced permeability in turn reduces the hydraulic conductivity thereof, and thereby inhibiting oxidant access to the entire contaminated site and rendering treatment of the soil and hazardous organic compounds incomplete. Further disadvantages of using permanganate(s) alone and in large quantities for subsurface remediation includes the formation of soluble manganese compounds in groundwater that may exceed drinking water standards. For this and the foregoing reasons, attempts to date to use permanganate(s) for in situ remedial applications have not been fully successful.

More recently, attempts have been made to resolve the disadvantages associated with the use of permanganate(s) by incorporating persulfate(s) oxidants into the in situ application, such as those techniques discussed in U.S. Pat. No. 6,474,908. The theory relied on therein utilizes the persulfate(s) to satisfy the total oxidant demand of the selected environment (soil, water, sludge, etc.) and then follows up with the permanganate(s) to treat target hazardous organic constituents. However, the total amount of permanganate(s) and persulfate(s) required to treat a large area is still excessive and the extent to which the reactant(s) travel in the aquifer before being spent or reacted is insufficient.

Because of these limitations of art before the present invention, there is a need for reactant(s) and methods of making reactant(s) for treating hazardous organic contaminant(s) in soil, sludge, groundwater, surface water, and wastewater that do not require electro-osmosis, heat, or inefficient metallic catalyst(s). What is needed are materials and methods of making the materials, wherein the materials react with the contaminant(s) and persistent in the zone(s) having the contaminant(s) to provide improved characteristics for use in environmental remediation.

SUMMARY OF THE INVENTION

The present invention provides reactants, methods of making reactants, and a method for treating hazardous organic contaminant(s) in soil, sludge, groundwater, surface water, and wastewater that does not require electro-osmosis, heat, or inefficient metallic catalyst(s), and may provide for easier handling, persistence in the zone(s) having the contaminant(s), and reactivity with the contaminant(s) to form more innocuous materials.

The present invention relates to environmental reactant(s), process of making environmental reactant(s), and process for the remediation of soil and/or water whether the contamination is a surface or subsurface contaminant. More specifically, the process of making the reactant(s) may provide reactant(s), suspended reactant(s), and/or encapsulated reactant(s) and methods for controlling the release and/or distribution of the reactant(s) thus providing a means for remediation of soil, water, wastewater, and/or other environmental remediation and/or treatment for in situ or ex situ processes.

The controlled release and/or distribution of the reactant(s) may be manipulated via a suspending liquid and/or encapsulating coating which targets contaminants or specific organic compounds in the environmental media being treated. Optionally, the reactant(s) made by the process of the present invention have a coating material thereabout providing suitable protection of the reactant for treating the environmental media without further encapsulation. The reactants may be oxidants, catalysts, chelants, transition metal amine complexes, combinations thereof, and/or other chemical constituents that effectuate a reaction with the targeted compounds. The reaction between the encapsulated reactant(s) and the targeted organic compounds renders the media being treated less hazardous.

The suspension having reactant(s) may be comprised of reactant particles suspended in a liquid. The liquid may have for example water, emulsifiers, surfactants, and/or other substances as are known in the art to substantially suspend the reactant(s) in a suspension or slurry.

The encapsulated reactant of the present invention may have a single reactant contained within a single encapsulant, a plurality of reactants contained within a single encapsulant, or a plurality of reactants contained within a plurality of encapsulants. An outer encapsulant provides for the targeting characteristic of the encapsulated reactant by masking, protecting, stabilizing, delaying, and/or controlling the release and/or distribution of the reactant(s) contained within. In one embodiment, the outer encapsulant is substantially oleophilic (i.e. has a stronger affinity for oils rather than water) which saves the reactant from reacting with water or untargeted constituents in the media being treated. Additionally, the outer encapsulant is substantially reactive, permeable and/or dissolvable with at least one of the target compound(s) being remediated. Therefore, when the encapsulated reactant is contacted with or exposed to the contaminants the coating dissolves, reacts, or absorbs at least one of the targeted compound(s) found in the media and exposes at least one reactant to the targeted compounds where it may react. Optionally, the encapsulated reactants may be placed in suspension or in a slurry.

The encapsulated reactant may have an organic compound in the outermost encapsulant providing the desired oleophilic and hydrophobic, characteristics. The reactants contained within the encapsulant may be a variety of reactants such as catalysts, chelants, transition metal amine complexes, oxidants, or other reactants. The encapsulated reactant of the present invention may used to treat a variety of environmental media having a variety of contaminants.

The coated and/or encapsulated reactants of the present invention, or the reactants made by the process of the present disclosure, can be used to treat soil, water, wastewater, silt, clay, etc. either in situ or ex situ. Different groups of encapsulated reactants having different reactants, different coatings, and/or different outermost encapsulants can be introduced into the media simultaneously, in discrete time intervals, at the same location, or at alternate locations. Such applications provide a means for effectuating a single reaction or multiple reactions, either in series or parallel toward a desired final media state.

DETAILED DESCRIPTION OF THE INVENTION

The present invention provides encapsulated reactant(s), methods for making coated, suspended, and/or encapsulated reactant(s), and methods for controlling the release and/or distribution of one or more reactants that provide for methods of soil, water, water treatment, and/or other environmental remediation and/or treatment. The term water as used herein refers to water in a broad sense and incorporates natural solutes. Water is considered to be a universal solvent and has hardness, metals, and a variety of minerals and salts naturally dissolved and/or ionized therein. Therefore, water includes solutes except for selected contaminants and inerts. The encapsulated reactants of the present invention, or the coated, suspended, and/or encapsulated reactants made by the disclosed process, may be used in in situ or ex situ processes. The controlled release and/or distribution of the reactant(s) may be manipulated via one or more suspending liquids, coating materials, and/or encapsulating coating to target contaminants or specific organic compounds in the media being treated. The reactants may be oxidants, catalysts, chelants, transition metal amine complexes, combinations thereof, and/or other constituents that effectuate an initial, intermediate, and/or final reaction with the organic compound(s) being targeted. The reaction between the reactant(s) and the targeted organic compounds causes the media being treated to have less hazardous characteristics. As used herein, the term "encapsulated" means having a form of protective enclosure and includes all forms of encapsulants and coatings and includes micro-encapsulants. The encapsulated reactant(s) embodiments made by the process of the present invention are depicted in the various FIGS. which are selected solely for the purpose of illustrating examples of encapsulated reactant(s) made by the process of the present invention. Other and different reactant(s), encapsulated and non-encapsulated, may be made by the process and utilize the inventive features described herein. Reference to the Figures showing several embodiments of products made by the process of the present invention is made to describe the presently claimed invention and not to limit the scope of the claims herein.

Figure 1:
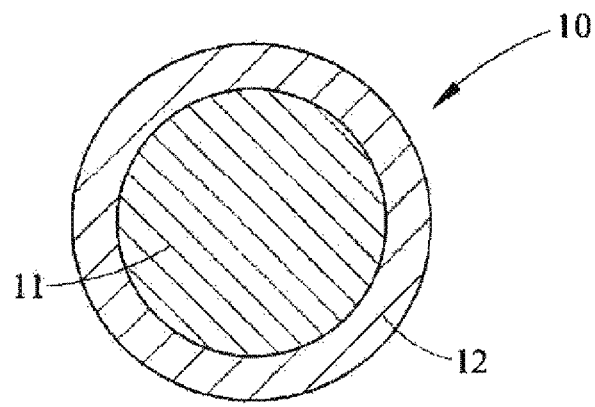
FIG. 1 is a cross-sectional view of an embodiment of the encapsulated reactant of the present invention showing one reactant within an encapsulant.

FIG. 1 shows a cross-sectional view of encapsulated reactant 10, an embodiment of a reactant made by the process of the present invention showing one reactant 11 within encapsulant 12. Outer encapsulant 12 provides for the targeting of organic constituents within the media being treated by masking, protecting, stabilizing, delaying, and/or controlling the release and/or distribution of reactant 11. Targeting is accomplished by having reactant 11 substantially isolated from the media and released or exposed to the contaminants or targeted organic compounds when encapsulated reactant 10 encounters the contaminants within the media being treated. Thus, encapsulant 12 saves reactant 11 from reacting with water or untargeted constituents in the media being treated so that reactant 11 remains substantially unreacted until contacting the targeted constituents. Therefore, reactant 11 is available for breaking down the targeted constituents when encapsulated reactant 10 encounters the targeted constituents within the media being treated.

The outer surface of outer encapsulant 12 contacts the media being treated and the inner surface of encapsulant 12 contacts reactant 11. Therefore, encapsulant 12 needs be substantially nonreacting, impermeable and/or nondisolving with the media being treated and reactant 11 (i.e., if media is water then encapsulant 12 is substantially water resistant). Additionally, encapsulant 12 needs be substantially reactive, permeable and/or dissolvable with at least one of the target organic compound(s) being treated. Thus, the composition of encapsulant 12 depends on the composition of reactant 11, the media being treated, and the targeted constituents.

Typically, in in situ remediation the media being treated is either water or has water moving within, such as soil. In this media environment outer encapsulant 12 needs be substantially nonreacting, impermeable and/or nondissolving with water. At the same time, encapsulant 12 needs be soluble, reactive, and/or permeable to at least one of the targeted compound(s) found in the media or environment being treated. The targeted constituents being remediated typically have at least one organic compound and therefore encapsulant 12 typically is substantially soluble, reactive, and/or permeable to at least one targeted organic compound within the zone of contamination in the media. At least one targeted organic compound can substantially permeate, react with, or dissolve encapsulant 12.

Encapsulant 12 is characterized by having one or more of a plurality of mechanisms for releasing and/or contacting reactant 11 with at least one targeted compound. One mechanism in which encapsulant 12 may expose reactant 11 to targeted compounds is where at least one targeted organic compound permeates encapsulant 12 causing an internal pressure of encapsulated reactant 10 to reach a level suitable for reverse osmosis, dispersing reactant 11 to the zone of contamination. A second mechanism involves encapsulant 12 dissolving and/or rupturing with at least one targeted organic compound releasing the encapsulated compounds or reactant 11 to the zone of contamination. Additionally, a "chemical trigger" can be incorporated within encapsulant 12 to allow for accelerated degradation of the encapsulant 12 and/or release of reactant 11 upon contact with the targeted compound groups being treated. The thickness, permeability, and/or composition of encapsulant 12 can be adjusted to control the rate at which at least one targeted compound penetrates, dissolves, and/or reacts with encapsulant 12 thereby distributing and/or diffusing reactant 11. Additionally, encapsulant 12 may be designed to sustain its characteristics for a period of time (days, weeks, or even months) when in contact with water. This characteristic of encapsulant 12 allows unreacted encapsulated reactants 10 to dissipate in the event they are not contacted with a targeted compound. Furthermore, encapsulant 12 may have the characteristic of not dissolving in a targeted compound or water, at least for an extended period of time, but being permeable to targeted compounds. Such an embodiment allows encapsulated reactant 10 to persist for an extended period of time allowing the targeted compounds to permeate encapsulant 12 and react with reactant 11. The foregoing mechanisms and embodiments of the encapsulated reactant of the present invention are provided as descriptive examples only and are not to serve as limiting the claims herein.

Environmental remediation, water treatment, and/or wastewater treatment often seeks to, via at least the final reaction, oxidize contaminants or compounds containing at least one oxidizable aliphatic or aromatic compound and/or functional group (e.g., chlorinated organics, aliphatic organics, aromatic organics, etc.). Examples include, but are not limited to, atrazine, benzene, butyl mercaptan, chlorobenzene, chloroethylvinyl ether, chloromethyl methyl ether, chlorophenol, chrysene, cyanide ion or organic cyanides, dichlorophenol, dichlorobenzene, dichloroethane, dichloroethene, dichloropropane, dichloropropene, ethyl alcohol, ethylbenzene, ethylene glycol, ethyl mercaptan, hydrogen sulfide, isopropyl alcohol, Lindane™, methylene chloride, methyl tert-butyl ether, naphthalene, nitrobenzene, nitrophenol, pentachlorophenol, phenanthrene, phenol, propylene, propylene glycol, Silvex™, Simazine™, sodium sulfide, tetrachloroethane, tetrachloroethene, toluene, trichlorobenzene, trichloroethane, trichloroethene, trichlorophenol, vinyl chloride, xylene, etc). Many, if not most, of these contaminants are organic based and exhibit some properties similar as oil.

Encapsulant 12 may have a hydrophobic or water resistant compound and is substantially non-reactive with adjacent reactant 11 and is furthermore substantially permeable or dissolvable with at least one targeted organic compound. Therefore, encapsulant 12 is often desired to be both substantially hydrophobic and substantially oleophilic, since many if not most of the targeted compounds exhibit similar properties as oil. Compounds found to have such attributes or properties desired in outer encapsulant 12 include those that comprise polymers of: ethylene, propylene, isobutylene, diisobutylene, styrene, ethylinylbenzene, vinyltoluene, and dicyclopentadiene; esters of acrylic and methacrylic acid, including the methyl, ethyl, propyl, isopropyl, butyl, sec-butyl, tert-butyl, amyl, hexyl, octyl, ethylhexyl, decyl, dedecyl, cyclohexyl, isobornyl, phenyl, benzyl, alkylphenyl, ethoxymenthyl, ethoxyethyl, ethoxypropyl, propoxymethyl, propoxyethyl, propoxpropyl, ethoxphenyl, ethoxybenzyl, and ethoxycyclohexyl esters; vinyl esters, including vinyl acetate, vinyl propionate, vinyl butyrate; vinyl ketones, including vinyl methyl ketone, vinyl ethyl ketone, vinyl isopropyl ketone, and methyl isopropenyl ketone; vinyl ethers, including vinyl methyl ether, vinyl ethyl ether, vinyl propyl ether, and vinyl isobutyl ether; diallyl phthalate, ethylene glycol diacrylate, ethylene glycol dimethacrylate, trimethylolpropanetrimethacrylate, divinylsulfone; polyvinyl and polyally ethers of ethylene glycol, of glycerol, of pentaerythritol, of diethyleneglycol, of monothio- and dithioderivatives of glycols, and of resorcinol; divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarboxylate, triallyl aconitate, triallyl citrate, triallyl phosphate, divinyl naphthalene, divinylbenzene, trivinylbenzene; alkyldivinylbenzenes having from 1 to 4 alkyl groups of 1 to 2 carbon atoms substituted on the benzene nucleus; trivinylnaphthalenes, and/or polyvinylanthracenes, etc., and the like. Other organic compounds such as cellulose, wax (i.e. canola wax), polylactic acid, and combinations and derivatives thereof have been found to exhibit the desired attributes of outer encapsulant 12. These constituents are presented herein as examples of compounds that may be incorporated into encapsulant 12 and are not to serve as limitations on the composition of encapsulant 12.

In certain exemplary embodiments, encapsulant 12 can range from approximately 10% to approximately 80% of the total weight of encapsulated reactant 10. Additionally, for subsurface applications, encapsulant 12 may have an outer dimension of less than 50 or even less than 10 μm. Such a configuration is suitable for groundwater treatment. Therefore, embodiments of encapsulated reactant 10 may be referred to as microencapsulants. Alternatively, encapsulant 12 may have a large outer dimension of up to an inch, or even more. Such larger size may be suitable for surface water or waste water treatment.

Reactant 11 is selected to react with at least one target constituent in the media being remediated. Reactant 11 may comprise one or more oxidant constituents that can comprise: peroxides, permanganates, persulfates, hypochlorite solutions, ozone, and/or fluorine, etc. Peroxide, such as hydrogen peroxide, sodium peroxide, calcium peroxide, potassium peroxide, and/or magnesium peroxide, etc, has been found effective in oxidizing many organic contaminants. Reactant 11 may comprise an oxidant suspended in an aqueous catalyst solution comprising a soluble metallic salt(s) (e.g., ferrous sulfate), chelate(s), and/or buffering agent(s). In certain environments, the aqueous catalyst solution has a circumneutral pH (e.g., a pH of approximately 5.5 to approximately 8.5, including all values and subranges there between). In other environments, an intermediate reaction between the aqueous catalyst solution and reactant 11 can be pH-independent. In still other environments, an intermediate reaction between the aqueous catalyst solution and reactant 11 can be pH-dependent.

Figure 2:
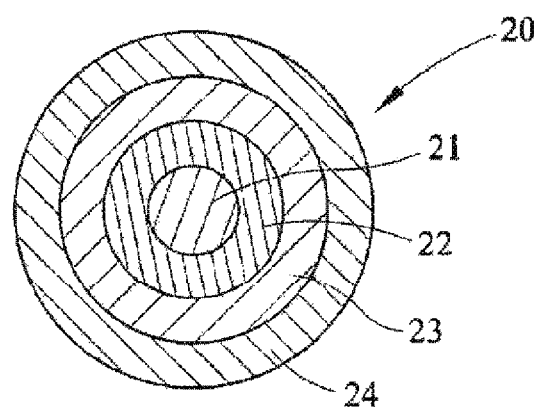
FIG. 2 is a cross-sectional view of an embodiment of the encapsulated reactant of the present invention showing a first and second reactant within a first and second encapsulant respectively.

FIG. 2 shows a cross-sectional view of an embodiment of encapsulated reactant 20, made by the process of the present invention, showing a first reactant 21 and a second reactant 23 within a first encapsulant 22 and second encapsulant 24 respectively. Reactant 21 may be a core oxidant or other reactant while reactant 23 may be the same or a different constituent (e.g. a catalyst) trapped between inner encapsulant 22 and the most outer encapsulant 24. In one embodiment of encapsulated reactant 20, a particle can comprise an inner oxidant core 21, surrounded by, yet potentially separated via encapsulant 22 from, an outer catalyst 23 that is surrounded by an outermost encapsulating coating 24. Thus, the core oxidant 21 can be segregated from the catalyst by the internal coating 22, and the catalyst can be segregated from the external environment by the secondary external coating or encapsulant 24. Alternatively, particle or reactant 21 can be an inner catalyst core, surrounded by, yet potentially separated from, an outer encapsulated oxidant 23. Encapsulating multiple constituents into one particle can provide a means for ensuring that the encapsulated constituents are released within the subterranean environment in the presence of one another to produce the desired intermediate reaction, and thus, the desired final reaction. This approach can provide particular utility in heterogeneous subterranean environments that extend over a relatively large area and/or volume. In this embodiment, encapsulant 24 needs to have similar characteristics as encapsulant 12, since both are exposed to the media that is being treated. However, inner encapsulant 22 may be permeable to water or the media in which it is distributed since it does not contact the media until the media penetrates outer encapsulant 24. Therefore, encapsulant 22 only need be non-reactive with reactants 21 and 23.

Figure 3:
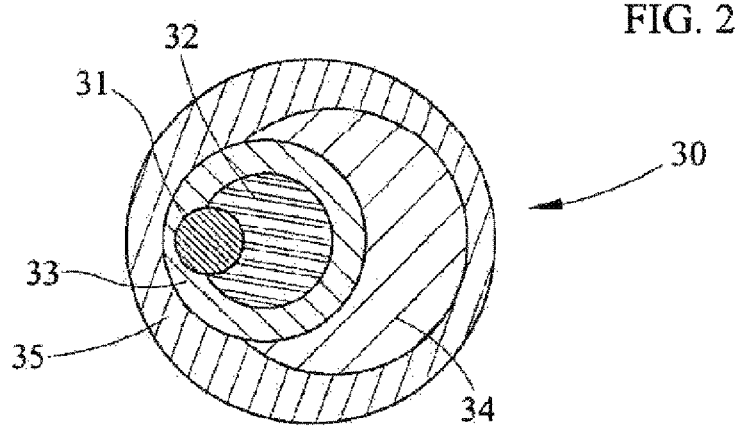
FIG. 3 is a cross-sectional view of an embodiment of the encapsulated reactant of the present invention showing a plurality or reactants within a plurality of encapsulants.

FIG. 3 shows a cross-sectional view of encapsulated reactant 30, made by the process of the present invention, showing a first reactant 31 and a second reactant 32 within a first encapsulant 33. A third reactant 34 is between first or inner encapsulant 33 and second encapsulant 35. Reactants 31 and 32 may be a core oxidant or other reactant and a catalyst, chelant, transition metal amine complex, other oxidant, or other reactant. Reactant 34 may be the same or a different constituent than reactants 31 and 32 trapped between inner encapsulant 33 and the most outer encapsulant 35. Encapsulating multiple constituents or reactants 31, 32, and 34 into one particle or encapsulated reactant 30 can provide a means for contacting the reactants 31, 32 34 in a specific sequence to produce the desired intermediate reaction, and thus, the desired final reaction. In this embodiment, encapsulant 35 needs to have similar characteristics as encapsulant 12, since both are exposed to the media that is being treated. However, inner encapsulant 33 may be permeable to water or the media in which it is distributed since it does not contact the media until the media penetrates outer encapsulant 35. Therefore, encapsulant 33 only need be non-reactive with reactants 31, 32 and 34. As shown here, encapsulated reactant 30 can have a variety of reactants and encapsulants such that an outer encapsulant 35 saves the contained reactants and encapsulants until encountering a target constituent. In such an embodiment, a plurality of reactants, chelants, transition metal amine complexes, and/or catalysts can be introduced into environment having targeted compounds in a controlled manner with a plurality of encapsulants.

Alternatively or additionally, reactant(s) made by the process of the present invention may be placed in a suspension. The reactant(s) may be un-encapsulated or encapsulated. The suspending liquid can be any liquid that provides for a suspension of reactant(s) in an environment to be treated and has a low oxidation potential with the reactant(s).

The suspended, coated and/or encapsulated reactant(s) described herein may be produced by first grinding or comminution: media milling (ball milling, batch milling, attritor milling, wet or dry processing, etc.); medialess milling (hammer mills, cryogenic hammer mills, jet milling, jaw crushing, high pressure dispersion milling, microfluidization, etc.); screening and/or sieving; air classification, etc. the reactant(s). The reactant(s) may then be encapsulated or coated by spray drying and prilling; dry powder coating; melt coating, deposition, etc. Alternatively, the reactant(s) are milled in the presence of at least one coating material to reduce reagglomeration of the reactant(s) during milling. Optionally, the at least one coating material provides a suitable coating of the reactant(s) for use in treating the environmental media without further coating or encapsulation. The encapsulated or un-encapsulated reactant(s) may be placed in suspension or in a slurry prior to placement into the environment to be treated.

The suspended, coated and/or encapsulated reactant(s) made by the process of the present invention may be used in treating surface water, groundwater and/or soil in situ or ex situ. For surface water and surface soil treatment, the suspended, coated and/or encapsulated reactants are typically placed directly on the zone of contamination or in the path of migration of the contaminants or targeted compounds. For in situ treatment of groundwater or soil, the suspended, coated and/or encapsulated reactants are typically injected into the zone of contamination through a well or direct push techniques. The injection may be accomplished by gravity feed or by forcing the reactants into the subsurface with a pump. In certain exemplary embodiments, the suspended, coated and/or encapsulated reactant(s) made by the process of the present invention can be injected (via an aqueous media) into the subterranean environment at pressures ranging up to approximately 8 psig, for example. The injection pressure can be dependent on the subterranean formation and/or the ability of the subterranean formation to accept the injected solution without substantial subterranean fractures and/or preferential pathways being created. In some subterranean formations it may be practical to inject the reactant(s), at a head pressure in excess of 8 psig.

The effective radius and/or path of subterranean influence, in regards to the above referenced embodiment, can be monitored by utilizing tracer agents (e.g., bromide, chloride, rhodamine, flourescein, and/or sulfur hexafluoride, etc.). The tracer can be compatible with site conditions and/or one or more of the constituents being employed. The tracer can be placed in the same aqueous media as the encapsulated reactants or particles and/or within the particles and/or their coating(s) or encapsulant(s). With respect to subterranean background levels (of, for example, conductivity values and/or specific ion levels), tracer concentrations preferably range from approximately 10 to 100 times greater.

Once the mixture is injected into the subterranean environment, environmental monitoring wells can be monitored and/or sampled for tracer detection (environmental monitoring wells can be strategically located within and/or adjacent to the area(s) of potential chemical impact and/or interest). As suggested above, the tracer can be detected by, for example, monitoring the conductivity levels of the groundwater compared against native background levels or by utilizing an ion specific electrode. An effective radius of subterranean influence can be assessed by measuring and/or comparing specific groundwater parameters (e.g., dissolved oxygen levels, oxidation reduction potential, salinity, and/or pH levels, etc.) before, during, and/or after the injection process. Fluctuations in these parameters can be observed in subterranean areas where an oxidation reaction has occurred.

Certain exemplary embodiments can provide a treatment technique for any and/or all of the above listed chemical contaminant(s) within a variety of medias and/or subterranean environments comprising: silts, clays, sands, fractured bedrock, karsts, organics, and/or tills. Via certain exemplary embodiments, in situ environmental remediation within subsurface bedrock and/or fractured bedrock networks can be greatly increased due to the above mentioned adjustable properties of the particle and/or aqueous mixture.

Alternatively, a trench may be dug down stream of the flow of a plume of contamination in the aquifer and filled with the reactants of the present invention. In this application, a suspending liquid, coating, and/or outer encapsulant may be designed to remain un-reacted or intact for an extended period of time (e.g. years) and as the plume of contamination passes through the trench, the encapsulant allows the targeted constituents to react with the reactant(s). Whether injected into the subterranean environment or placed in a trench around the plume of contamination, a reactive oxidant can be kept segregated from a metallic salt(s), chelate(s), and/or buffering agent(s) by internal encapsulation, hence deferring any intermediate reaction there between. Once the desired time or condition of exposure to an aqueous environment has elapsed and/or a "triggered" exposure to the contaminant(s) of concern has occurred, an outer encapsulant can release the oxidant into the presence of the metallic salt(s), chelate(s), and/or buffering agent(s), allowing any intermediate reaction there between to occur, and thereby resulting in the production of oxidizing free radicals, hydroxyl radicals, sulfate radicals, or the like possibly by virtue of a mimicked Fenton's reaction. The radicals can undergo a final reaction with the contaminant(s) of concern, oxidizing the contaminant compound(s) (typically exothermically), often times into final products of carbon dioxide and water.

The method of using products made by the method of the present invention may utilize a combination of one or more reactants. The reactant(s) may be applied directly, suspended, coated, and/or encapsulated. The reactant(s) may comprise oxidant(s), metallic salt catalyst(s), and/or chelating agent(s) under conditions which enable oxidation of most, and preferably substantially all, volatile, semi-volatile, or non-volatile organic and/or inorganic compounds in soil, rock, sludge, water, groundwater, and/or wastewater (in situ or ex situ) rendering them less harmful. In one embodiment of the present invention, a combination of encapsulated oxidant(s) (a persulfate group—potassium or sodium), catalyst(s) (iron salt), and chelating compound(s) (EDTA) are injected into the subsurface simultaneously within an aqueous mixture, slurry, or suspension. For instance, a combination of suspended reactant(s), may include a first group of suspended, coated and/or encapsulated reactants having persulfate and a second group of suspended, coated and/or encapsulated reactants having ferrous sulfate. Injection into the subsurface can be gravity fed or under pressure, both resulting in the dispersion of the reactants within the targeted area of concern including both up-gradient and down-gradient placements. The suspended, coated and/or encapsulated reactants of the present invention may remain substantially unreactive within the subsurface until contact with the target contaminant occurs. Upon contact, the suspending liquids, coatings, and/or encapsulants about the reactants may begin to degrade, weaken, or become more permeable until the reactant contacts the target contaminant(s). The oxidant and/or catalyst and/or chelating agent react independently or in combination, resulting ultimately in the partial or complete oxidation of the target contaminant(s). The final by-products of the oxidation reaction are typically carbon dioxide, water, a salt group (depending on oxidant of choice), and an inorganic chloride ion (if contaminant is chlorinated).

In the embodiment of the invention where the reduced size reactant particles, un-encapsulated or encapsulated, are placed in suspension or slurry several advantages may be realized. The slurries or suspensions of the reduced sized reactant particles may serve to overcome a low solubility of the reactant(s). For example, the zone of contamination may be targeted with a direct application of a concentrated suspension or slurry, thereby minimizing the total fluid volume required for treatment application. For example, potassium permanganate has a solubility of about 4% by weight in water. The concentration of the reactant(s) in the slurry may be increased by using different suspending fluids or by adding surfactants, emulsifiers, or polymeric materials to water to form a suspending liquid, for example. The concentration of the reactant in suspension may be increased to 25%, 50%, or even more. This increase in reactant concentration in suspension may reduce the volume of the suspension to be injected or placed in the in situ environment. The subterranean formations in the in situ environment may have a limited capacity to accept fluid without displacing the groundwater and contamination present. Introducing a large volume of suspension or slurry may push contamination further away from its source and further away from the reactant(s). Higher concentrated slurries reduce the volume to be applied, thus reducing any displacement of the contaminant(s). Additionally, the more concentrated suspensions or slurries may reduce the injection or application time.

In another selected embodiment of the present invention, a reactant having sodium persulfate and optionally a catalyst, e.g. one or more metallic salts, may be contained within an encapsulant having cellulose, wax, polylactic acid, or combinations or derivatives thereof. Such an embodiment has been found to provide persistence of the reactant(s) in water until the encapsulated reactants encounter the targeted compounds at which point the reactant(s) break down the targeted constituents rendering them less harmful.

The outer coating and/or encapsulant surrounding the reactant(s) may be designed to delay the chemical reaction between reactant and targeted contaminant(s) to allow for an extended coverage area and/or time when applied to subsurface treatment. Additionally, the size of the encapsulated reactant can be preselected to allow for less restricted flow through the subterranean environment, and thereby can provide for extended coverage areas and/or reduced loading restrictions. Encapsulated reactants can also be engineered to rise, sink, and/or be suspended within subterranean aqueous environments by adjusting buoyancy and/or specific gravities of the encapsulated reactant(s) of the present invention. Buoyancy can be adjusted by trapping a small gas bubble within the encapsulation, to offset the density of one or more constituents. A more buoyant (overall density of encapsulation ("solute") less than aqueous media ("solution")) encapsulated particle can be utilized when treating light non-aqueous phase liquid(s) chemical(s) of concern, which can be more abundant toward the upper approximately 25% of the aqueous media. A less buoyant (overall density of encapsulation ("solute") greater than aqueous media ("solution")) encapsulated particle can be utilized when treating dense non-aqueous phase liquid(s) chemical(s) of concern, which can be more abundant in the lower approximately 25% of the aqueous media.

Another aspect of the present invention is a process for making reduced sized oxidant particles. A coating material that is substantially oleophilic, hydrophobic, siliphilic, hydrocarbon soluble, or exhibits a combination of these properties is fed into a mill. The coating material exhibiting these properties may have a melting point below the operating temperature of the mill so that the material is in a liquid state during milling. Oxidant particles of an initial or first size are introduced into the mill and milled. The mill may be a media mill having a media that aids in particle size reduction and is separable from the milled oxidant particles. Alternatively, the mill may be a batch mill or other mill. The oxidant particles are milled to a reduced size in the mill. During the milling, the coating material continuously substantially coats the oxidant particles, which may reduce reagglomeration of the reduced sized oxidant particles. The particles are milled to a reduced size, which is smaller than the first or initial size, and may have a mean diameter of at most 100 μm, or may be as small as 10 μm, or even 5 μm or even less than 1 μm. The milled particles may have a mean diameter of about 1 μm.

The coating material may have a melting point below the operating temperature of the mill since a liquid coating material may have a greater propensity to coat the oxidant particles as they are being milled. The coating material may be an oil or wax and may be derived from animals, hydrocarbons, vegetables, silicones, or any combinations thereof. For example, the coating material may be a wax such as paraffin that may have a melting point above room temperature. Optionally, the coating material is a combination of oils, waxes, or oils and waxes and may have a viscosity greater than 0.894 cP or rheology such that the particles remain substantially suspended in the coating material during the milling process. Additionally, the coating material may have a melting point above the operational temperature of the mill and still exhibit the desired properties of substantially reducing the reagglomeration of the oxidant particles as they are being milled.

EXAMPLES

Example 1

Potassium permanganate ($KMnO_4$) was milled in a media mill. The feed stock of $KMnO_4$ had a first particle size of about 100-200 The media mill was manufactured by Custom Milling & Consulting, Inc and had a milling shaft with a plurality of discs extending radially therefrom. The tip speed of the discs during milling was between about 1800 and 2500 fpm. The milling shaft extended into a cylindrical screen which was enclosed in a jacketed milling chamber. Cerium stabilized zirconium oxide milling media having about a 0.8 mm diameter was placed within the screen. The screen had slot openings smaller than the diameter of the milling media so as to retain the media therein. A discharge from the mixing chamber fed into a jacketed holding vessel. Material was accumulated in the holding vessel and was recirculated back through the mixing chamber. The particle size of the milled particles was then measured with a laser scattering analyzer in accordance with ASTM B822.

The milling chamber and holding vessel were heated to a temperature of about 125° F. A coating material of hydrogenated soy bean wax was fed into the media mill. $KMnO_4$ of the first particle size of about 100-200 μm was fed into the screen in the milling chamber. The hydrogenated soy bean wax and $KMnO_4$ were added to the milling chamber at a weight ratio of about 3:1. The milling shaft was rotated within the screen milling the $KMnO_4$ for about four hours. An amount of $KMnO_4$ and hydrogenated soy bean wax was continually discharged from the milling chamber into the holding vessel where it was recirculated back into the milling chamber. Samples of the milled $KMnO_4$ were collected at 1, 2, 3, and 4 hours at the point of discharge into the holding vessel and analyzed for particle size. The particle size of the oxidant particles are shown in Table 1.

Example 2

The milling chamber and holding vessel of Example 1 were heated to a temperature of about 125° F. A coating material of paraffin wax was fed into the media mill of Example 1. $KMnO_4$ of the first particle size of about 100-200 μm was fed into the milling chamber. The paraffin wax and $KMnO_4$ were added to the milling chamber at weight a ratio of about 3:1. The milling shaft was rotated within the screen milling the $KMnO_4$ for about 3 hours. An amount of $KMnO_4$ and paraffin wax was continually discharged from the milling chamber into the holding vessel where it was recirculated back into the milling chamber. A sample of the milled $KMnO_4$ was collected after 3 hours of milling at the point of discharge into the holding vessel and analyzed for particle size. The particle size of the oxidant particles are shown in Table 1.

Example 3

Coating materials of mineral oil and paraffin wax were fed into a batch mill where the coating materials comprise 95% mineral oil and 5% paraffin. $KMnO_4$ of the first particle size of about 100-200 μm was fed into the basket in the mill. The coating materials and $KMnO_4$ were added to the milling vessel at weight a ratio of about 4:1. The $KMnO_4$ was milled for about 3.5 hours. A sample of the milled $KMnO_4$ was collected after 1, 1.5, 2, 3, and 3.5 hours of milling and analyzed for particle size. The particle size of the oxidant particles are shown in Table 1.

TABLE 1

| Coating material | Hours milled | Mean oxidant particle size (μm) |
| --- | --- | --- |
| Hydrogenated soy bean wax | 1 | 2.5 |
| Hydrogenated soy bean wax | 2 | 1.8 |
| Hydrogenated soy bean wax | 3 | 1.4 |
| Hydrogenated soy bean wax | 4 | 1.5 |
| Paraffin | 3 | 1.6 |
| 95% mineral oil, 5% molten paraffin | 1 | 5.6 |
| 95% mineral oil, 5% molten paraffin | 1.5 | 4.3 |
| 95% mineral oil, 5% molten paraffin | 2 | 4.5 |
| 95% mineral oil, 5% molten paraffin | 3 | 3.6 |
| 95% mineral oil, 5% molten paraffin | 3.5 | 1.6 |

The data of Examples 1, 2, and 3 in Table 1 shows that generally an increase in milling time decreases oxidant particle size. However, there may be a minimum obtainable mean particle size for a specific coating material. For example, a minimum mean particle size was obtained after 3 hours in Example 1. At that minimum mean particle size, the additional milling may be offset by a tendency of the particles to reagglomerate. However, other or different combinations of coating materials and/or increased milling time may result in a lower mean particle size, less than 1 μm. For example, in Example 3 it was shown generally that additional milling of the oxidant particles in a coating material of mineral oil and paraffin resulted in further reduction of particle size. The selected coating material allows for maximum particle size reduction for the selected oxidant particle. For example, substantially saturated hydrocarbons having few or no branches or functional groups may be useful coating materials for reducing the particle size of permanganate containing oxidant particles. Additionally, the mean particle size may be lowered by maintaining a low moisture content in the environment surrounding the oxidant particles and coating material during milling as moisture may contribute to the tendency of the oxidant particles to reagglomerate. For example, an inert gas such as nitrogen, argon, or carbon dioxide may be introduced into a housing enclosing the mill. Further other oxidants may be milled to a lower minimum particle size. However, the particle sizes reported here are means as processes in the examples produced an amount of particles having a particle size of less than 1 μm.

Oxidant particles produced by a milling process may be used as a reactant without further processing. In this aspect of the invention, the coating material may provide sufficient properties to maintain the oxidant particles in a substantially nonreacted state until contacting a targeted constituent. Alternatively, oxidant particles produced by a milling process may be encapsulated with encapsulating material(s). Additionally, the oxidant particles may be placed in suspension, with or without further encapsulation after milling. This suspension of oxidant particles may be suitable for injection directly into a zone of contamination or in a path of migration thereof.

In a yet further embodiment of the present invention, the milling process may include reducing the size of an oxidant particle by milling the oxidant in the presence of a coating material or materials. In this embodiment, oxidant particle size is reduced by milling an oxidant particle of a first size in the presence of at least one coating material to form an oxidant particle of a second size, the second size being at least 10% less than the first size oxidant particle beginning the milling process. The duration of milling may be adjusted to produce oxidant particles of a desired size.

The present invention provides several advantages over the prior art. The small particle size of the oxidant particles make them suitable for holding in a suspension that may be applied directly into the environment to be treated. The optionally provided substantially hydrophobic and substantially oleophilic outer encapsulant in the encapsulated reactants of embodiments of the instant invention provide a means to control the release of reactant(s) until contact occurs with the targeted contaminants. This provides a highly efficient contaminant destruction ratio using lesser amounts of oxidant(s), catalyst(s), chelating agents and/or other reactants. Areas of influence, both horizontally and vertically, from point of application or injection may be increased. The reactants provide more capability of controlling the reactant's path of travel or distance since the properties of the coating material, suspending fluid, and/or outer encapsulant may be modified. The reactant's size, surface area, buoyancy, specific gravity, density, etc. may be manipulated to engineer encapsulated reactant(s) to float, suspend, or sink within the subsurface providing an increased means of reaching targeted contaminants.

One feature or aspect of an embodiment is believed at the time of the filing of this patent application to possibly reside broadly in a process for making reduced sized oxidant particles comprising: feeding a coating material into a mill, the material having a characteristic selected from the group consisting of substantially oleophilic, hydrophobic, siliphilic, hydrocarbon soluble, and combinations thereof; introducing oxidant particles of a first size into the mill; milling the oxidant particles with the material; reducing the particle size of the oxidant particles to the reduced size, the reduced size being less than the first size; and coating a substantial portion of each of the reduced sized oxidant particles with the coating material.

Another feature or aspect of an embodiment is believed at the time of the filing of this patent application to possibly reside broadly in a process for making reduced sized oxidant particles, wherein the reduced size oxidant particles have a mean diameter of at most 100 μm.

Yet another feature or aspect of an embodiment is believed at the time of the filing of this patent application to possibly reside broadly in a process for making reduced sized oxidant particles, wherein the reduced size oxidant particles have a mean diameter of at most 10 μm. Still another feature or aspect of an embodiment is believed at the time of the filing of this patent application to possibly reside broadly in a process for making reduced sized oxidant particles, wherein the reduced size oxidant particles have a mean diameter of at most 5 μm.

A further feature or aspect of an embodiment is believed at the time of the filing of this patent application to possibly reside broadly in a process for making reduced sized oxidant particles, wherein the reduced size oxidant particles have a mean diameter of at most 1 μm.

Another feature or aspect of an embodiment is believed at the time of the filing of this patent application to possibly reside broadly in a process for making reduced sized oxidant particles, wherein the reduced size oxidant particles are in a substantially nonoxidized state.

Yet another feature or aspect of an embodiment is believed at the time of the filing of this patent application to possibly reside broadly in a process for making reduced sized oxidant particles, wherein the mill is a media or batch mill.

Still another feature or aspect of an embodiment is believed at the time of the filing of this patent application to possibly reside broadly in a process for making reduced sized oxidant particles, wherein the mill is maintained at a temperature above a melting point of the coating material.

A further feature or aspect of an embodiment is believed at the time of the filing of this patent application to possibly reside broadly in a process for making reduced sized oxidant particles, wherein the oxidant particles have an oxidant selected from the group consisting of persulfate, permanganate, peroxygen and combinations thereof.

Another feature or aspect of an embodiment is believed at the time of the filing of this patent application to possibly reside broadly reduced sized oxidant particles formed by the presently disclosed process.

Yet another feature or aspect of an embodiment is believed at the time of the filing of this patent application to possibly reside broadly in a reduced sized oxidant particles formed by the disclosed process, the particles having an outermost encapsulant forming an outer surface of the oxidant particle, the outermost encapsulant being substantially non-reacting, impermeable and non-dissolving with water.

One feature or aspect of an embodiment is believed at the time of the filing of this patent application to possibly reside broadly in the particles formed by the disclosed process placed in suspension.

Another feature or aspect of an embodiment is believed at the time of the filing of this patent application to possibly reside broadly in a process for making oxidant particles comprising: providing solid oxidants of a first size; providing a coating material; feeding the oxidants of a first size and the coating material into a mill; milling the oxidants of a first size producing milled oxidants; coating the milled oxidants with the coating material; continuing the milling and the coating steps in the mill until the oxidants of a first size are reduced in size by a sufficient amount to produce the oxidant particles.

Yet another feature or aspect of an embodiment is believed at the time of the filing of this patent application to possibly reside broadly in the process of process for making oxidant particles, wherein the oxidant particles reduced in size in the mill have a mean diameter of at most 100 μm.

Still another feature or aspect of an embodiment is believed at the time of the filing of this patent application to possibly reside broadly in the process of process for making oxidant particles, wherein the coating material has a characteristic selected from the group consisting of substantially oleophilic, hydrophobic, siliphilic, hydrocarbon soluble, and combinations thereof.

A further feature or aspect of an embodiment is believed at the time of the filing of this patent application to possibly reside broadly in the process of process for making oxidant particles, wherein the coating material is in a liquid phase during the milling step.

Another feature or aspect of an embodiment is believed at the time of the filing of this patent application to possibly reside broadly in the process of process for making oxidant particles, wherein the coating material is an oil or wax having an origin selected from the group consisting of animal, hydrocarbon, vegetable, silicone, and combinations thereof.

Yet another feature or aspect of an embodiment is believed at the time of the filing of this patent application to possibly reside broadly in a process for making oxidant particles comprising; feeding at least one coating material into a mill; feeding at least one oxidant of a first size into the mill; milling the at least one oxidant of a first size in the presence of the at least one coating material to form oxidants of a second size, the second size being at least 10% less than the first size.

Still another feature or aspect of an embodiment is believed at the time of the filing of this patent application to possibly reside broadly in the process for making oxidant particles, wherein the step of feeding at least one coating material comprises feeding at least two coating materials.

A further feature or aspect of an embodiment is believed at the time of the filing of this patent application to possibly reside broadly in the process for making oxidant particles, wherein the mill is maintained at a temperature above a melting point of each of the coating materials during the milling step.

Another feature or aspect of an embodiment is believed at the time of the filing of this patent application to possibly reside broadly in the process for making oxidant particles, wherein the at least one coating material is suitable for substantially coating the at least one oxidant during the milling step reducing exposure of the at least one oxidant to moisture.

One feature or aspect of an embodiment is believed at the time of the filing of this patent application to possibly reside broadly in a process for making coated reduced sized oxidant particles consisting essentially of the steps of: heating a mill; feeding a coating material and oxidant particles into the heated mill, the coating material having a characteristic selected from the group consisting of substantially oleophilic, hydrophobic, siliphilic, hydrocarbon soluble, and combinations thereof; milling the oxidant particles with the coating material and thereby reducing the particle size of the oxidant particles and coating a substantial portion of each of the reduced size oxidant particles with the coating material, providing the coated reduced sized oxidant particles; and wherein the mill is maintained at a temperature above a melting point of the coating material.

Another feature or aspect of an embodiment is believed at the time of the filing of this patent application to possibly reside broadly in the process for making coated reduced sized oxidant particles, wherein the reduced size oxidant particles have a mean diameter of at most 100 µm.

Yet another feature or aspect of an embodiment is believed at the time of the filing of this patent application to possibly reside broadly in the process for making coated reduced sized oxidant particles, wherein the reduced size oxidant particles have a mean diameter of at most 10 µm.

Still another feature or aspect of an embodiment is believed at the time of the filing of this patent application to possibly reside broadly in the process for making coated reduced sized oxidant particles, wherein the reduced size oxidant particles have a mean diameter of at most 5 µm.

A further feature or aspect of an embodiment is believed at the time of the filing of this patent application to possibly reside broadly in the process for making coated reduced sized oxidant particles, wherein the reduced size oxidant particles have a mean diameter of at most 1 µm.

Another feature or aspect of an embodiment is believed at the time of the filing of this patent application to possibly reside broadly in the process for making coated reduced sized oxidant particles, wherein the reduced size oxidant particles are in a substantially nonoxidized state.

Yet another feature or aspect of an embodiment is believed at the time of the filing of this patent application to possibly reside broadly in the process for making coated reduced sized oxidant particles, wherein the mill is a media or batch mill.

Still another feature or aspect of an embodiment is believed at the time of the filing of this patent application to possibly reside broadly in the process for making coated reduced sized oxidant particles, wherein the oxidant particles have an oxidant selected from the group consisting of persulfate, permanganate, peroxygen, and combinations thereof.

A further feature or aspect of an embodiment is believed at the time of the filing of this patent application to possibly reside broadly in a process for making coated oxidant particles comprising the of the steps of: providing solid oxidants of a first size; providing a coating material; heating a mill; feeding the oxidants of a first size and the coating material into the heated mill; milling the oxidants of a first size producing milled oxidants; coating the milled oxidants with the coating material; continuing the milling and the coating steps in the mill until the oxidants of a first size are reduced in size by a sufficient amount to produce the coated oxidant particles; and wherein the coating material is maintained in a liquid phase during the milling step.

Another feature or aspect of an embodiment is believed at the time of the filing of this patent application to possibly reside broadly in the process for making coated oxidant particles, wherein the coated oxidant particles reduced in size in the mill have a mean diameter of at most 100 µm.

Yet another feature or aspect of an embodiment is believed at the time of the filing of this patent application to possibly reside broadly in the process for making coated oxidant particles, wherein the coating material has a characteristic selected from the group consisting of substantially oleophilic, hydrophobic, siliphilic, hydrocarbon soluble, and combinations thereof.

One feature or aspect of an embodiment is believed at the time of the filing of this patent application to possibly reside broadly in the process for making coated oxidant particles, wherein the coating material is an oil or wax having an origin selected from the group consisting of animal, hydrocarbon, vegetable, silicone, and combinations thereof.

Another feature or aspect of an embodiment is believed at the time of the filing of this patent application to possibly reside broadly in a process for making coated oxidant particles comprising; heating a mill; feeding at least one coating material into the heated mill; feeding at least one oxidant of a first size into the heated mill; milling the at least one oxidant of a first size in the presence of the at least one coating material to form oxidants of a second size, the second size being at least 10% less than the first size;

substantially coating the oxidants of a second size with the at least one coating material, during the milling step, and providing the coated oxidant particles; and wherein the coating material has a melting point below the operational temperature of the mill.

Yet another feature or aspect of an embodiment is believed at the time of the filing of this patent application to possibly reside broadly in the process for making coated oxidant particles, wherein the step of feeding at least one coating material comprises feeding at least two coating materials.

Still another feature or aspect of an embodiment is believed at the time of the filing of this patent application to possibly reside broadly in the process for making coated oxidant particles, wherein the at least one coating material is suitable for substantially coating the at least one oxidant throughout the milling step and thereby reducing exposure of the at least one oxidant to moisture.

A further feature or aspect of an embodiment is believed at the time of the filing of this patent application to possibly reside broadly in the process for making coated oxidant particles, wherein the coating material is a combination of oils, waxes, or oils and waxes having a viscosity greater than 0.894 cP at the operational temperature of the mill.

Another feature or aspect of an embodiment is believed at the time of the filing of this patent application to possibly reside broadly in the process for making coated oxidant particles, wherein the second size is less than 2 micrometers.

In at least one embodiment of the present disclosure, the reactant(s) may be encapsulated with an encapsulant by procedures such as for example high temperature extrusion or molding, tabletting, microencapsulation, to formulate them into their final shapes, before administration.

In at least one other embodiment of the present disclosure, the reactant(s) may be coated with the encapsulant to form any shape. For example, encapsulated reactants of the present disclosure may be formed by techniques well known in the art, such as spray drying or prilling, by extrusion or compression in molds, or by a agglomeration of fine powders in rotating drums using a liquid phase binder, or encapsulant, and/or heat.

In at least one further embodiment of the present disclosure, the encapsulated reactant of the present disclosure may be made by melting the encapsulant, mixing the reactant(s) into the melted encapsulant, and cooling the mixture to form a solid mass of encapsulate reactant. The mixture may be cooled in a mold to form any desired shape of the encapsulated reactant.

One feature or aspect of an embodiment is believed at the time of the filing of this patent application to possibly reside broadly an encapsulated reactant for insertion into a subterranean zone of contamination which is contaminated by a targeted contaminant, the encapsulated reactant comprising: a plurality of reactant particles; and a single encapsulant encapsulating each of the reactant particles, wherein the mass of the single encapsulant ranges from about 10% to about 80% of the total mass of the encapsulated reactant, wherein the encapsulated reactant has an outer dimension greater than one inch; and wherein the encapsulated reactant is of sufficient size and mass such that it does not flow through the subterranean zone of contamination when inserted therein.

Another feature or aspect of an embodiment is believed at the time of the filing of this patent application to possibly reside broadly in the encapsulated reactant, wherein the single encapsulant comprises a substantially oleophilic compound.

Yet another feature or aspect of an embodiment is believed at the time of the filing of this patent application to possibly reside broadly in the encapsulated reactant, wherein the substantially oleophilic compound comprises a constituent selected from the group consisting of cellulose, wax, polylactic acid, and combinations and derivatives thereof.

Still another feature or aspect of an embodiment is believed at the time of the filing of this patent application to possibly reside broadly in the encapsulated reactant, wherein the single encapsulant is adapted to be capable of being degraded, weakened, or permeated by the targeted contaminant.

A further feature or aspect of an embodiment is believed at the time of the filing of this patent application to possibly reside broadly in the encapsulated reactant, wherein the single encapsulant comprises a component adapted to provide for accelerated degradation of the single encapsulant upon contact with the targeted compound.

Another feature or aspect of an embodiment is believed at the time of the filing of this patent application to possibly reside broadly in the encapsulated reactant, wherein each of the plurality of reactant particles comprises an oxidant.

Yet another feature or aspect of an embodiment is believed at the time of the filing of this patent application to possibly reside broadly in the encapsulated reactant, wherein the oxidant comprises a chemical moiety selected from the group consisting of persulfate, permanganate, and peroxygen.

Still another feature or aspect of an embodiment is believed at the time of the filing of this patent application to possibly reside broadly in the encapsulated reactant, wherein the oxidant is potassium permanganate.

A further feature or aspect of an embodiment is believed at the time of the filing of this patent application to possibly reside broadly in the encapsulated reactant, wherein the reactant is reactive with the targeted contaminant such that it degrades the target contaminant.

Another feature or aspect of an embodiment is believed at the time of the filing of this patent application to possibly reside broadly in the encapsulated reactant, wherein the size and mass of the encapsulated reactant are adapted to allow the encapsulated reactant to float, suspend or sink within a subsurface of the earth.

Yet another feature or aspect of an embodiment is believed at the time of the filing of this patent application to possibly reside broadly in a process of making a solid encapsulated reactant suitable for placement in a subterranean zone of contamination which is contaminated by a target encapsulant, the process comprising: preparing an encapsulant by melting a mass of the encapsulant to convert the encapsulant to a non-solid state thereby making a prepared encapsultant; combining a plurality of reactant particles with the prepared encapsulant thereby melt coating the plurality of reactant particles with the prepared encapsulant thereby making an encapsulated reactant; and cooling the encapsulated reactant thus forming the solid encapsulated reactant, wherein the solid encapsulated has an outer dimension of at least one inch, further wherein the solid encapsulated reactant is of sufficient size and mass such that it does not flow through the subterranean zone of contamination.

Another feature or aspect of an embodiment is believed at the time of the filing of this patent application to possibly reside broadly in the process of making a solid encapsulated reactant, wherein the prepared encapsulant comprises a substantially oleophilic compound.

Yet another feature or aspect of an embodiment is believed at the time of the filing of this patent application to possibly reside broadly in the process of making a solid encapsulated reactant, wherein the substantially oleophilic compound comprises a constituent selected from the group consisting of cellulose, wax, polylactic acid, and combinations and derivatives thereof.

Still another feature or aspect of an embodiment is believed at the time of the filing of this patent application to possibly reside broadly in the process of making a solid encapsulated reactant, wherein the prepared encapsulant is adapted to be capable of being degraded, weakened, or permeated by the targeted contaminant.

A further feature or aspect of an embodiment is believed at the time of the filing of this patent application to possibly reside broadly in the process of making a solid encapsulated reactant, wherein the prepared encapsulant comprises a component adapted to provide for accelerated degradation of the single encapsulant upon contact with the targeted compound.

Another feature or aspect of an embodiment is believed at the time of the filing of this patent application to possibly reside broadly in the process of making a solid encapsulated reactant, wherein each of the plurality of reactant particles comprises an oxidant.

Yet another feature or aspect of an embodiment is believed at the time of the filing of this patent application to possibly reside broadly in the process of making a solid encapsulated reactant, wherein the oxidant comprises a chemical moiety selected from the group consisting of persulfate, permanganate, and peroxygen.

Still another feature or aspect of an embodiment is believed at the time of the filing of this patent application to possibly reside broadly in the process of making a solid encapsulated reactant, wherein the oxidant is potassium permanganate.

A further feature or aspect of an embodiment is believed at the time of the filing of this patent application to possibly reside broadly in the process of making a solid encapsulated reactant, wherein the reactant is reactive with the targeted contaminant such that it degrades the target contaminant.

Another feature or aspect of an embodiment is believed at the time of the filing of this patent application to possibly reside broadly i in the process of making a solid encapsulated reactant, wherein the size and mass of the encapsulated reactant are adapted to allow the encapsulated reactant to float, suspend or sink within a subsurface of the earth.

The invention claimed is:

1. A sustained release reactant blend for treating a medium containing a contaminant, the sustained release reactant blend comprising:
   a solid reactant blend comprising
      a first reactant;
      a second reactant; and
      a matrix, wherein at least one of the first and second reactant is substantially coated by the matrix to form a substantially coated reactant;
   wherein the solid reactant blend is defined by a structure such that the medium and contaminant can flow into the structure and contact the substantially coated reactant; and
   wherein the first reactant and the second reactant provide for a sustained reactant release over a time period that is at least one month.

2. The sustained release reactant blend of claim 1, wherein the first reactant is potassium permanganate.

3. The sustained release reactant blend of claim 1, wherein the first reactant is sodium persulfate.

4. The sustained release reactant blend of claim 1, wherein the matrix is insoluble and biodegradable.

5. The sustained release reactant blend of claim 1, wherein the sustained reactant release increases when a surface area of the sustained release reactant blend is increased.

6. The sustained release reactant blend of claim 1, wherein the matrix is paraffin wax.

7. The sustained release reactant blend of claim 6, wherein the paraffin wax provides a coating for the first reactant and the second reactant such that the sustained release reactant blend is a structured mass.

8. The sustained release reactant blend of claim 7, wherein the sustained reactant release increases when a surface area of the sustained release reactant blend is increased.

9. A process for making a combined sustained release reactant having a solid reactant blend, the process comprising:
   selecting a first reactant;
   selecting a second reactant;
   preparing a matrix, the prepared matrix capable of coating the first reactant and the second reactant;
   combining the first reactant, the second reactant, and the prepared matrix by mixing to make a combination; and
   forming the combined sustained release reactant into the solid reactant blend;
   wherein the combined sustained release reactant has a structure;
   wherein at least one of the first and second reactant is substantially coated by the matrix; and
   wherein the first reactant and the second reactant provide for a sustained reactant release over a time period that is at least one month.

10. The process of claim 9, wherein the first reactant is potassium permanganate.

11. The process of claim 9, wherein the first reactant is sodium persulfate.

12. The process of claim 9, wherein the matrix is paraffin wax.

13. The process of claim 9, wherein the sustained reactant release increases when a surface area of the combined sustained release reactant is increased.

* * * * *